United States Patent [19]

Wickham

[11] Patent Number: 4,760,895

[45] Date of Patent: Aug. 2, 1988

[54] ELECTRIC ACTUATORS

[75] Inventor: David J. Wickham, Chippenham, Great Britain

[73] Assignee: Westinghouse Brake and Signal Company Limited, United Kingdom

[21] Appl. No.: 43,817

[22] Filed: Apr. 29, 1987

[30] Foreign Application Priority Data

May 17, 1986 [GB] United Kingdom ............... 8612061
Oct. 9, 1986 [GB] United Kingdom ............... 8624235

[51] Int. Cl.⁴ .................. F03G 1/00; B60T 13/04; F16D 65/56
[52] U.S. Cl. .................. 185/40 R; 188/173; 188/196 F; 188/202
[58] Field of Search ............ 185/40 R; 188/171, 173, 188/196 F, 196 V, 202

[56] References Cited

U.S. PATENT DOCUMENTS

| | | | |
|---|---|---|---|
| 3,131,788 | 5/1964 | Newell | 188/202 X |
| 3,693,759 | 9/1972 | Schindel | 185/40 R |
| 4,431,089 | 2/1984 | Nadas et al. | 188/202 X |
| 4,651,852 | 3/1987 | Wickham et al. | 188/173 X |

FOREIGN PATENT DOCUMENTS 2141503A 12/1984 United Kingdom.

*Primary Examiner*—Allan D. Herrmann
*Attorney, Agent, or Firm*—Larson and Taylor

[57] ABSTRACT

A spring applied force actuator having an output member movable from a first position to a second output position, a first power spring by which can be generated on the output member an output force when the member is in its second position, first power means by which potential energy can be generated in the first spring therein to be held until the spring is released to apply its stored force as an output force on the output member, a second spring release of potential energy stored in which moves the output member from its first position to its second output position, and second power means by which the output member can be moved back from its second output position to its first position thereby, at the same time, generating in the second spring the potential energy subsequently to move the output member back to its second output position upon the subsequent release of that second spring.

10 Claims, 2 Drawing Sheets

ELECTRIC ACTUATORS

This invention relates to electric actuators and, more particularly although not exclusively, to such actuators for railway braking systems.

The invention relates specifically to electrical actuators of the type in which a spring is the source of the output force of the actuator, this spring having its potential energy generated by an electric motor operable to vary the length of the spring. The energy is held stored in the spring until the spring is subsequently released to allow the stored energy of the spring to be released as the output force. In such actuators it is commonly required that the output force be exerted by the spring on the output member of the actuator only after the output member has been moved into a predetermined force-exerting position—in the case of a brake actuator, only after the brakes have been engaged. This requirement is because, if the spring which is to exert the output force is used also to move the output member into the predetermined force-exerting position, the necessary variation of the length of the spring to effect this movement will detract from the maximum value of the output force which the spring could subsequently exert in the force-exerting position of the output member.

To obviate this problem, this invention provides an electric actuator having an output member movable from a first position to a second output position, a first power spring by which can be generated on the output member an output force when the member is in its second output position, a first power means by which potential energy can be generated in the first spring therein to be held until the spring is released to apply its stored force as an output force on the output member, a second spring release of the potential energy stored in which moves the output member from its first position to its second output position, and second power means by which the output member can be moved back from its second output position to its first position thereby, at the same time, generating in the second spring the potential energy subsequently to move the output member back to its second output position upon the subsequent release of that second spring.

The first power means may be an electric motor as may also the second power means.

The first spring may extend between ground and a part movable to generate the potential energy in the first spring by the first power means which operates on the part. In such an arrangement, the first power means may be connected to said part via a lever fulcrumed to ground and pivotally connected to said part. Said part may be a cylindrical housing into which extends the first spring.

The second spring may be a clock-type spring and in this case and when said part mentioned above is a cylindrical housing, the second spring may be housed in the end of the cylindrical housing remote from the end through which the first spring extends into the housing. The second spring may be connected by one end to a rotatable threaded member threadedly engaged with the output member.

With such a construction a so-called "slack-adjusting" facility can readily be incorporated into the actuator.

This can readily be done by including in the drive path between the second spring and the output member a one-way clutch such that in the event of the second spring having completed its normal variation of length corresponding to movement of the output member to its second output position and it being indicated that the output member has not, in fact, reached that position, the second electric motor can be operated to continue movement of the output member until it is detected as being in its second output position.

One embodiment of the invention will now be described in greater detail, by way of example only with reference to the accompanying drawings of which:

The accompanying drawings show an electric actuator which is a railway brake actuator although the invention is equally applicable to other electric actuators.

Figure 1:
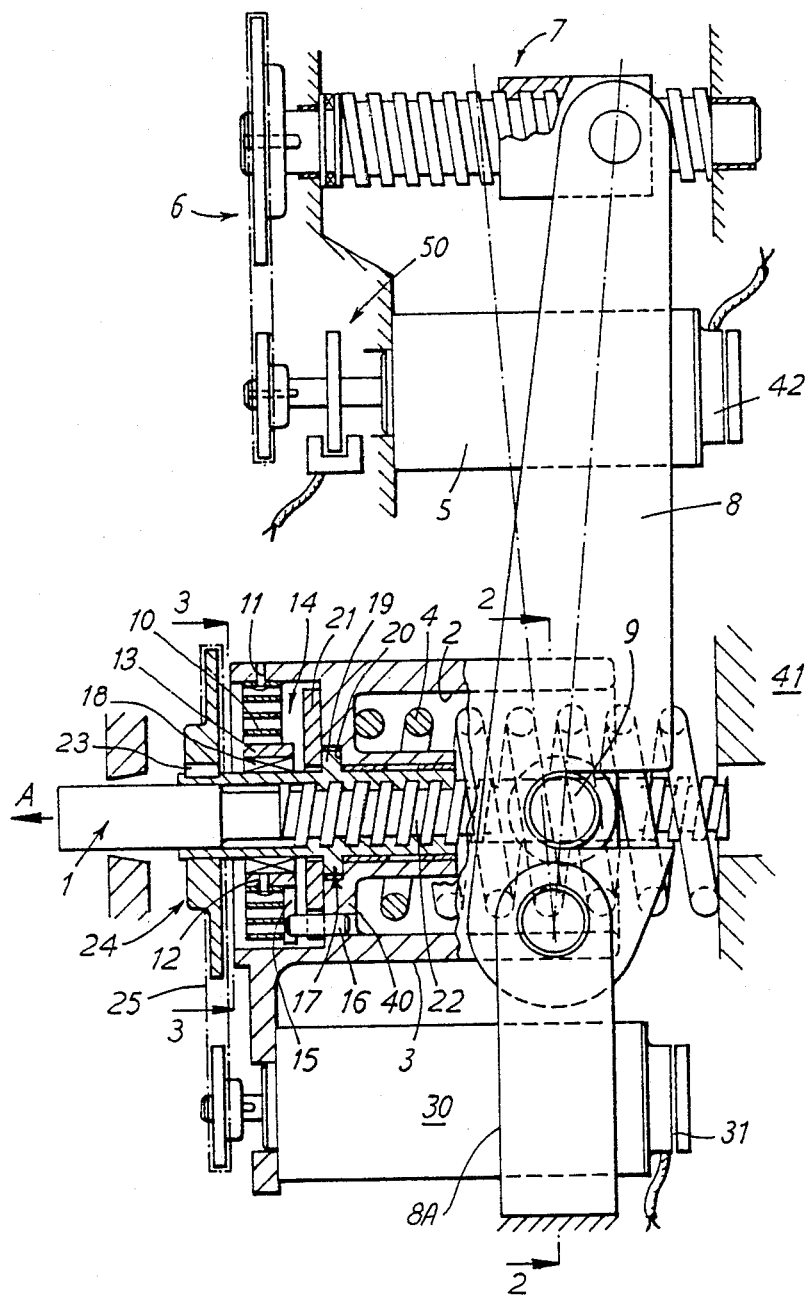
FIG. 1 shows a general arrangement drawing of the actuator.

Referring to the drawings, the actuator comprises a rotationally fixed output member 1 movable from its first position as shown in FIG. 1 in the direction of arrow "A" to its second output position in which the brake blocks (not shown) engage the railway-vehicle wheel (also not shown).

Within the annular chamber 2 of a hollow-walled cylindrical housing 3 is a first power spring 4 arranged to be compressed to generate potential energy in the spring 4 by an electric motor 5 through gearing 6, a screw-and-nut combination 7, a pair of levers 8 pivotally supported by a pair of arms 8A, and a pair of pins 9 secured to the housing 3.

Figure 3:
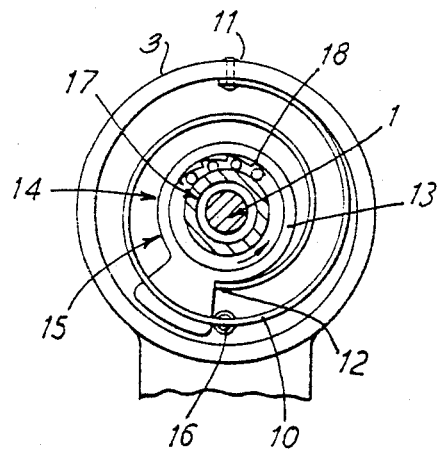
FIG. 3 shows a cross-section on the line 3—3 of FIG. 1.
Figure 2:
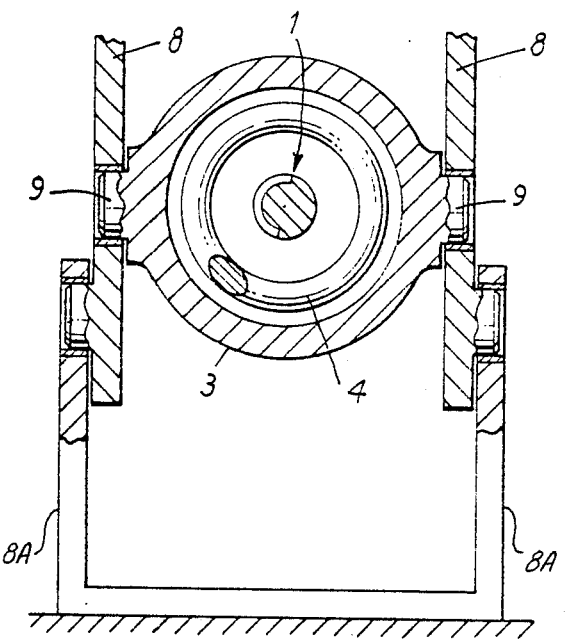
FIG. 2 shows a cross-section on the line 2—2 of FIG. 1.

A second clock-type spring 10 is located in the left-hand end (as viewed in the drawing) of the housing 3. The clock spring 10 is secured at 11 by one end of the spring to the housing 3 and at 12 by its other end to the central boss 13 of a spring housing 14. The housing 14 has a radial protrusion 15 (FIG. 3) from the boss 13 engageable by a pin 16 fixed in the housing 3. By this protrusion-and-pin 15/16 arrangement, the spring housing 14 can rotate relative to the housing 3 through only a limited angular distance—say, 300 degrees.

The spring housing 14 is drivingly-engaged with tube 17 through a one-way clutch 18. The tube 17 is provided with a flange 19 by which the tube 17 is located axially within the housing 3 between a shoulder 20 in the housing 3 and a washer 21. The tube 17 is threaded at its right-hand end portion (as viewed in FIG. 1) threadedly to engage the threaded portion 22 on the output member 1. At its left-hand extremity (as viewed in FIG. 1) the tube 17 has keyed to its at 23 chain-gear wheel 24 arranged to be driven by chain 25 by a second electric motor 30 fitted with an electromagnetic brake 31.

It can thus be seen that the clock-spring 10 can be "wound-up" to generate in it potential force, by operation of the second electric motor 30 through chain 25, chain-gear wheel 24, tube 17, one-way clutch 18 and the spring housing 14.

In the "release" position of the above described actuator, the first power spring 4 will have been compressed by the motor 5. Previous operation of this motor 5 will have moved, through gearing 6, screw-and-nut combination 7 and levers 8, the housing 3 to the right (as viewed in FIG. 1) thus compressing the power spring 4 between the end wall 40 and ground 41. In this compressed condition of the power spring 4 in which potential energy will have been stored in the spring 4, the motor 5 wil have been locked to hold the spring 4 compressed by energisation of the electromagnetic brake 42 of the motor 5.

Also, the second clock-spring 10 will have been "wound up" by the motor 30. Previous operation of the motor 30 will have rotated, through chain 25, chain-gear wheel 24 and one-way clutch 18, the spring housing 14 to "wind up" the spring 10. In this condition of the spring 10 in which potential energy will have been stored in the spring 10, the motor 30 will have been locked to hold the spring 10 "wound up" by energisation of the electromagnetic brake 42 of the motor 30.

The brakes are "applied" by the following operations:

Firstly, the electromagnetic brake 31 is released. This allows the "wound up" clock spring 10 to unwind rotating the output member 1 through the one-way clutch 18. By virtue of the threaded connection of the right-hand end (as viewed in FIG. 1) of tube 17 with the screw threaded portion 22 of the output member 1, the output member 1 will be driven to the left (as viewed in FIG. 1). Such movement of the output member 1 will normally be terminated when the brakes are engaged—i.e. when the output member is in its second force-exerting position. However, should there be excessive slack in the brakes, the output member 1 will not have reached its second position when the spring 10 has fully unwound. When this condition is detected, the motor 30 is energised to rotate in the opposite direction in which it rotates to "wind up" the spring 10. Such operation of the motor 30, through gear chain 25, chain-gear wheel 24, tube 17 and thread 22, will drive the output member 1 still further to the left (the one-way clutch 18 "freewheeling") until further leftward movement of the output member 1 is finally halted by its reaching its second "brakes-engaged" position.

When the output member 1 is detected as being in its second force-exerting position—i.e. its "brakes-engaged" position—the electromagnetic brake 42 of the first electric motor 5 will be released. This will free the power spring 4 to expand exerting an output force on the output member 1. Expansion of the power spring 4 will also rotate the motor 5 backwards by virtue of the expansion of the spring 4 acting through the pivot 9, levers 8, nut-and-screw combination 7 and gearing 6. Such rotation of the motor 5 can be measured by an encoder 50 and this measurement will be indicative of the output force being generated on the output member 1 by the spring 4. This measurement can be compared with the degree of rotation of the motor 5 equating with the required value of the output force and when rotation of the motor 5 indicates that this required value has been reached, the motor 5 can be locked against further rotation by its electromagnetic brake 42 holding the output force at the required value.

The brakes are subsequently released by sequential re-energisation of motors 5 and 30 firstly to re-compress and hold re-compressed the power spring 4 and thereafter to re-wind and hold re-wound the clock-spring 10.

It will be seen that the protrusion-and-pin construction 15/16 limiting as it does the extent of wind-back of the output member 1 will ensure a predetermined degree of movement back of the output member 1 to its first position and, therefore, a predetermined degree of "clearance" of the brakes. Thus, this construction provides a "slack adjustment" function.

I claim:

1. A spring applied force actuator having an output member movable from a first position to a second output position, a first power spring by which can be generated on the output member an output force when the member is in its second position, first power means by which potential energy can be generated in the first spring therein to be held until the spring is released to apply its stored force as an output force on the output member, a second spring release of potential energy stored in which moves the output member from its first position to its second output position, and second power means by which the output member can be moved back from its second output position to its first position thereby, at the same time, generating in the second spring the potential energy subsequently to move the output member back to its second output position upon the subsequent release of that second spring.

2. An actuator as claimed in claim 1, wherein the first power means is an electric motor.

3. An actuator as claimed in claim 2, wherein the second power means is an electric motor.

4. An actuator as claimed in claim 1, wherein the first spring extends between ground and a part movable to generate the potential energy in the first spring by the first power means which operates on the part.

5. An actuator as claimed in claim 4, wherein the first power means is connected to said part via a level fulcrumed to ground and pivotally connected to said part.

6. An actuator as claimed in claim 4, wherein said part is a cylindrical housing into which extends the first spring.

7. An actuator as claimed in claim 1, wherein the second spring is a clock-type spring.

8. An actuator as claimed in claim 7, wherein one end of the second spring is connected to a rotatable threaded member threadedly engaged with the output member.

9. An actuator as claimed in claim 1, wherein the first spring extends between ground and a cylindrical housing into which the first spring extends, this housing being movable to generate the potential energy in the first spring by the first power means which operates in the housing, and wherein the second spring is a clock-type spring which is housed in the end of the cylindrical housing remote from the end through which the first spring extends into the housing.

10. An actuator as claimed in claim 1, wherein there is included in the drive path between the second spring and the output member a one-way clutch such that in the event of the second spring having completed its normal variation of length corresponding to movement of the output member to its second output position and it being indicated that the output member has not, in fact, reached that position, the second power means can be operated to continue movement of the output member until it is detected as being in its second output position.

* * * * *